2 Sheets—Sheet 1.

W. G. MERRELL.
Harvester Rake.

No. 73,452.                    Patented Jan'y 21, 1868.

Witnesses                Inventor
                         William G. Merrill.
                         By atty A. B. Stoughton.

2 Sheets—Sheet 2.

W. G. MERRELL.
Harvester Rake.

No. 73,452.

Patented Jan'y 21, 1868.

Witnesses.       Inventor.
                 William G. Merrill,
                 By atty A. B. Stoughton.

UNITED STATES PATENT OFFICE.

WILLIAM G. MERRELL, OF AUBURN, NEW YORK, ASSIGNOR TO HIMSELF AND CYRENUS WHEELER, JR.

IMPROVEMENT IN HARVESTER-RAKES.

Specification forming part of Letters Patent No. 73,452, dated January 21, 1868.

*To all whom it may concern:*

Be it known that I, WILLIAM G. MERRELL, of Auburn, in the county of Cayuga and State of New York, have invented certain new and useful Improvements in Self-Acting Rakes for Harvesting-Machines; and I do hereby declare the following to be a full, clear, and exact description of the same, reference being had to the accompanying drawings, making a part of this specification, in which—

Figure 1:
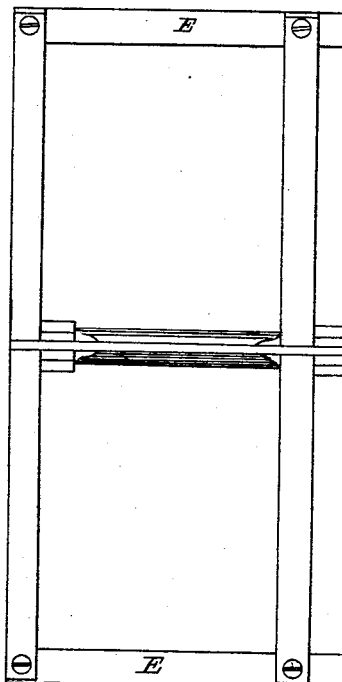
Figure 1:
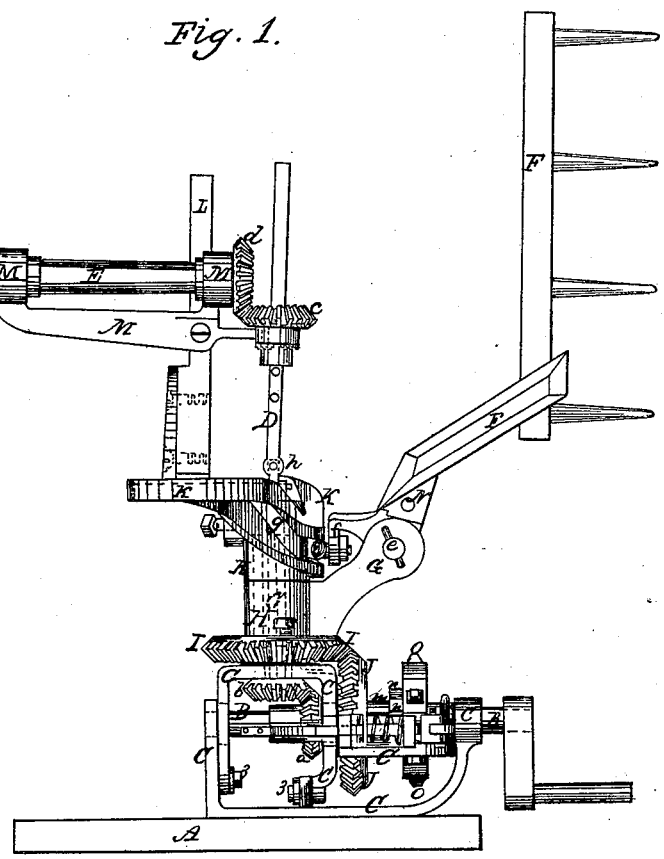
Figure 2:
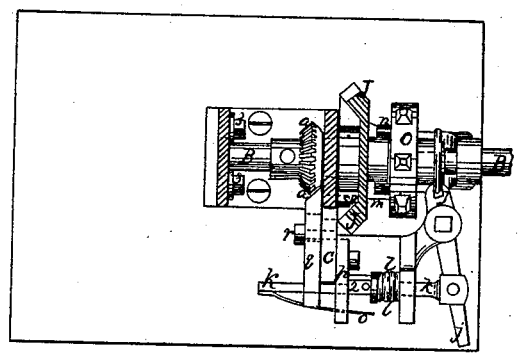
Figure 3:
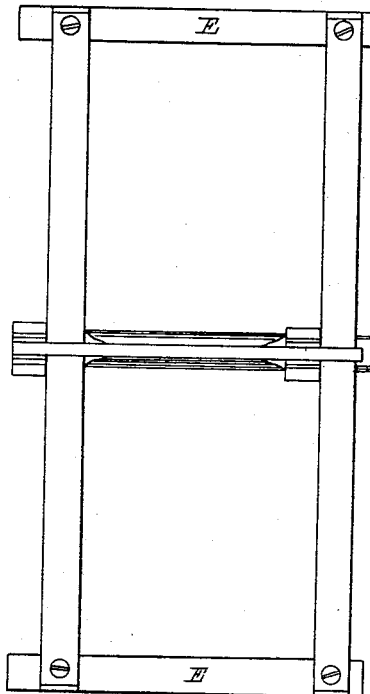
Figure 3:
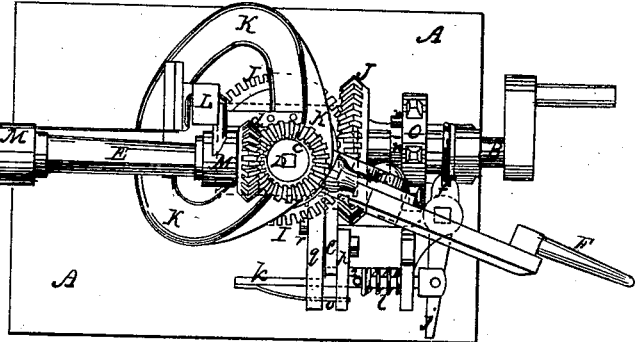

Figure 1 represents a front elevation of the rake as arranged to work in connection with a reel. Fig. 2 represents a horizontal section taken through the gearing, as will be explained. Fig. 3 represents a top plan of the rake, reel, and the mechanism for operating them.

Similar letters of reference, where they occur in the separate figures, denote like parts of the apparatus in all the drawings.

My invention relates to a rake that works in connection with a reel, making a portion of its circuit in the same path or plane with the reel, and which rake, at the end of every circuit, throws itself out of action, and so remains while the reel continues to revolve, until the operator, by moving a lever or other clutch-operating mechanism, puts the rake into action, and which is so timed and arranged that it cannot ever come in contact with the reel, though passing in between its blades or arms, and moving a portion of its circuit in the path of the reel.

To enable others skilled in the art to make and use my invention, I will proceed to describe the same with reference to the drawings.

A represents a portion of the frame of a harvesting-machine, upon which the rake, reel, and mechanism for operating them are placed. The shaft B is rotated by any suitable connection with the driving-wheels of the machine, and from this shaft both the rake and reel are operated as follows: C is a metallic frame, for supporting and furnishing suitable bearings for the shafts and journals to turn in. Upon this frame there is permanently fixed, so as to be a part of it, a hollow vertical column or sleeve, through which the shaft D, that drives the reel E, passes and works, said shaft receiving its motion from the main driving-shaft B through the beveled gears $a\ b$, one on each of said shafts, and transmits this motion to the reel through the beveled gears $c\ d$, one on the shaft D and the other on the reel-shaft E, and thus the reel may have a continuous motion.

The rake F is connected to an arm, G, which has a hub, H, upon it, that sits over and revolves around the hollow column or sleeve-portion of the metallic frame C; and upon the bottom portion of this hub H there is cast or wrought a bevel-gear, I, into which a bevel-gear, J, on the drive-shaft B works and revolves, and through this gear the rake receives its rotating motion. Upon this same hollow or sleeve portion of the permanent but adjustable frame C there is fastened a cam ledge or frame, K, so as to be rigid thereon when fixed or adjusted, and be, as it were, a part of the frame itself; and upon this cam frame or ledge K the reel-shaft E is supported by a post, L, thereon and an adjustable bracket, M, on said post, with two bearings in or on it. The rake-shank N, to which the rake F is attached, is pivoted or hinged to the arm G at the point $e$; and upon said shank N there is a short bent arm, $f$, that carries a friction-roller, $i$, that runs in the cam-way or groove $g$, and gives the rake its rising-and-falling motion as it turns around the adjustable hollow stem or column.

The roller $i$, it will be perceived, runs against the under side of the camway or groove, and not on top of the cam, as is usually the way.

There is an under-guiding cam-ledge; but the upper one, against the under side of which the roller runs, is the operating-cam. The shaft D is jointed at $h$, so that when the reel is adjusted in one direction the gears $c\ d$ may continue to work; and, that the reel may be raised or lowered on the post L, the bevel-gear $c$ on the shaft D is made adjustable by holes and pins, or a pin, so that it may be raised or lowered correspondingly with the reel, and their gears kept in mesh.

O is a clutch-wheel, having a series of projections, $n$, upon its face, one of which takes against a projection, $m$, upon the face of the gear J when said clutch-wheel is thrown toward the gear by the lever $j$; and this clutch is automatically moved or thrown out or disengaged at every complete revolution of the rake, as will be explained.

Connected to the clutch-lever $j$ there is a latch-bar, $k$, around which a spring, $l$, is coiled; and upon this latch-bar $k$ there is also another spring, $o$, which forces it toward the keeper or catch-piece $p$, and causes a notch, 2, in said bar to take or catch over the keeper $p$, and there hold. Upon the projecting portion $c$ of the metallic frame, on one side of which the keeper $p$ is arranged, there is a trigger, $q$, which can move on the frame by means of a slot through it, and through which slot a stud or screw, $r$, passes, to hold to the arm, but still allow it to move. The outer end of this trigger is forked, and straddles the latch-bar $k$. The inner end is turned at right angles to the line of its length, and passes through an opening in the arm or frame C, as shown by dotted lines at $s$. Upon the cogged gear J there is a projection, $v$, which, when it comes against the bent end of the trigger $q$, forces it outward against the latch-bar $k$.

The clutching and unclutching mechanism works as follows: The driver or operator, with his foot or hand, pushes the lever $j$ into the position shown in Fig. 2, which compresses the spring $l$, draws the latch-bar with it until its notch 2 comes opposite the catch $p$, when the spring $o$ forces it against said catch, where it is held. This clutches the gear J to the shaft B, and it consequently turns with said shaft, and in turning it also turns the gear I, which is on the hub H of the arm G that carries the rake, and, of course, turns the rake also. In the recessed portion of the gear J there is a projection, $v$, as above stated, and when it comes around it strikes against the bent end $s$ of the trigger $q$, and pushes said trigger outward. The outward movement of the trigger pushes out the latch-bar $k$ until its notch 2 is released from the catch $p$, and then the recoil of the spring $l$ shifts the lever into the position shown in Fig. 3, and unclutches the drive-gear J from the shaft, and the rake stops.

Whenever sufficient grain has accumulated on the platform to form a gavel, the clutch-lever is moved, the rake makes a complete circuit, cutting in between the arms of the reel, and clearing the platform; and when, in its circuit, it arrives at the point and position shown in Fig. 1, the projection $v$ moves the trigger and throws it out of action, and it remains in that position until the clutch-lever is again moved.

By this construction of mechanism the rake may be thrown into action at any time, and, though it moves in between the arms of the reel, it never runs afoul of them, so that no conflict or collision between the two can occur, though one moves constantly and the other intermittently. A friction-spring under the gear I, dropping into a recess in the frame C, holds the rake still.

The frame C is composed of two parts, the portion to which the hollow column is attached being pivoted around the journal of the driving-shaft B, so that it can be moved forward or back for the purpose of adjusting it to the different inclinations of the platform, so that the rake-teeth will properly follow its surface. When set in the proper position, set-screws or bolts 3 3 clamp it firmly to the other or under part of the frame, and then it acts as one frame.

Having thus fully described my invention, what I claim therein as new, and desire to secure by Letters Patent, is—

1. In combination with the hollow column, supporting the revolving and stationary hubs, the jointed shaft D, that passes up through it and drives the reel, as and for the purpose described.

2. In combination with a reel and a rake that moves and operates in conjunction therewith, a clutching mechanism, and a cam-ledge that operates substantially as and for the purpose described.

3. In combination with a reel whose axis of rotation is parallel to the cutting apparatus, adjustable vertically in relation thereto, and is supported by one end only, a rake so arranged as to revolve around the support of the reel, and be thrown into and out of action by a mechanism operating substantially as described.

4. A support for the rake and reel, so arranged that it may be moved about the driving-gear axis, for the purpose of adjusting the rake to the different inclinations of the platform, substantially as described.

WILLIAM G. MERRELL.

Witnesses:
WM. F. KING,
EDWARD A. THOMAS.